United States Patent Office 3,158,904
Patented Dec. 1, 1964

3,158,904
VACUUM-FORMING MACHINES
Thomas Edward Horace Gray, Sutton Coldfield, and James Jones-Hinton, Solihull, England, assignors to Dunlop Rubber Company Limited, county of London, England, a British company
Filed Jan. 29, 1963, Ser. No. 254,806
Claims priority, application Great Britain, Feb. 16, 1962, 5,975/62
3 Claims. (Cl. 18—19)

This invention relates to vacuum-forming machines.

In previously known vacuum-forming machines a sheet of thermoplastic material to be vacuum-formed is clamped between clamping members prior to heating and forming, and also during those operations.

Clamping is effected in these previously known machines by means of a plurality of nuts and bolts, the bolts passing through the clamping members, it being necessary to tighten and then loosen the nuts for each clamping and unclamping operation before and after heating and forming each sheet. This is time consuming and it is necessary to gauge the clamping pressure on each nut carefully to effect proper clamping.

It is an object of the present invention to provide rapid sheet clamping and unclamping means for a vacuum-forming machine, and also to provide clamping and unclamping means in which uniform clamping pressure can rapidly be obtained.

According to the invention, a vacuum-forming machine for forming sheets of thermoplastic material comprises a machine member having a sheet clamping surface, a clamping frame movable towards and away from the clamping surface during a clamping operation, a clamp bar, and means for moving the clamp bar into and out of engagement with the clamping frame and for applying clamping pressure to the bar.

Preferably a plurality of adjustable means are attached to the clamp bar for contacting the clamping frame, the clamping pressure being transmitted from the clamp bar to the clamping frame through the plurality of adjustable means. The adjustable means may comprise a plurality of bolts, having locknuts, fitted into tapped holes provided in the clamp bar. Adjustment of the bolts enables an evenly distributed clamping pressure on the clamping frame to be obtained.

An embodiment of the invention will now be described by way of example with reference to the accompanying drawings in which.

Figure 1:
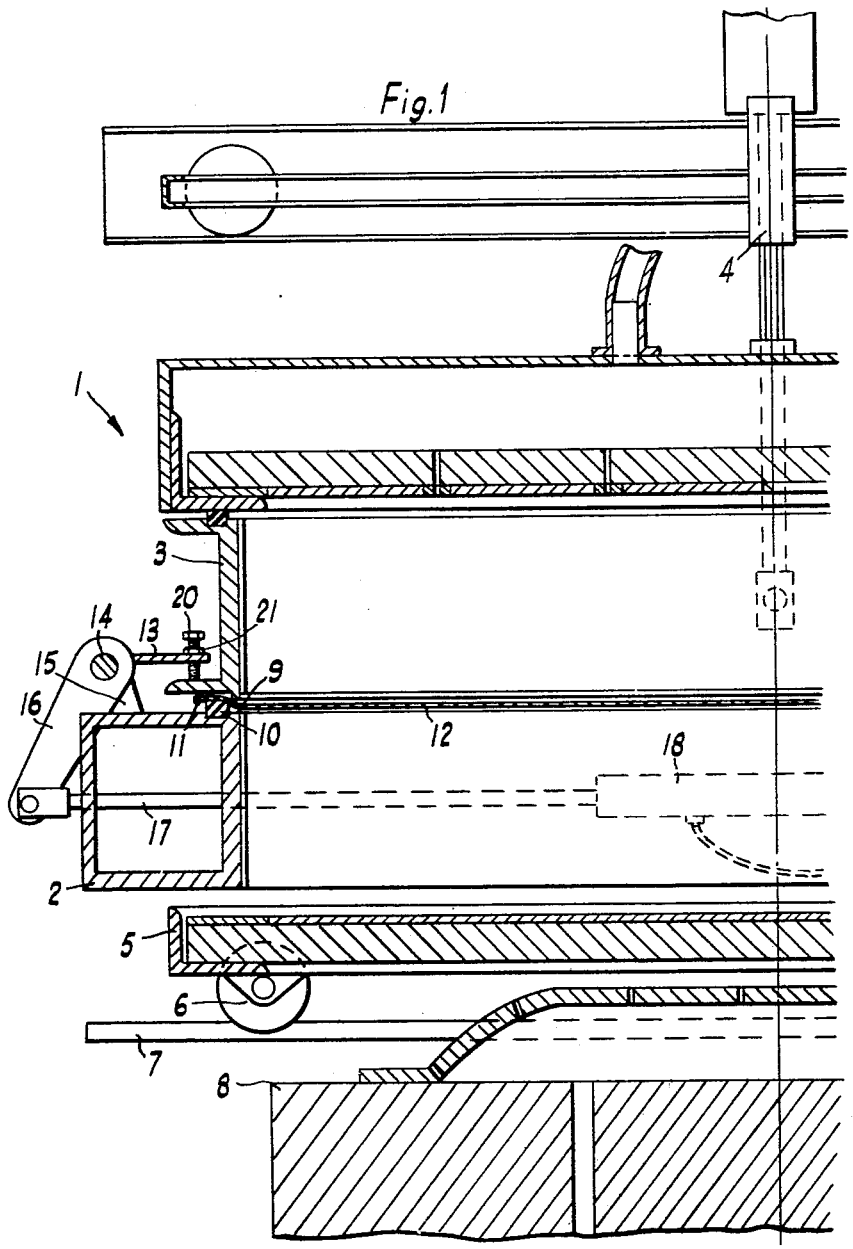
FIGURE 1 is a cross-sectional view of part of a vacuum-forming machine.

FIGURE 1 shows part of a vacuum-forming machine 1 provided with a machine member in the form of a frame 2, a clamping frame 3 supported for vertical movement by a pair of fluid-operated piston and cylinder assemblies 4 (one of which is shown), a bottom machine frame 5 mounted by means of wheels 6 on guide rails 7 (one wheel and rail being shown) and a vacuum forming tool 8.

The frame 2 has a clamping surface 9 around the margin of which is disposed a compressible rubber seal 10, and the vertically movable clamping frame 3 has a clamping surface 11 for co-operation with the clamping surface 9 on the frame 2 for clamping a sheet 12 of thermoplastic material disposed between the clamping surfaces 9 and 11.

A clamp bar 13 is mounted on a shaft 14 extending with its axis parallel to a longitudinal axis of the clamping frame 3 and rotatably supported on the frame 2 by brackets 15. (See also FIGURES 2 and 3.) An extension 16 projects from and is rigidly secured to each end of the shaft 14 and the free end of each extension 16 is pivotally secured to the free end of the piston rod 17 of a corresponding double-acting piston and cylinder mechanism 18 pivotally mounted on the frame 2 at 19.

The clamp bar 13 is provided with a plurality of tapped holes formed in and spaced along the length of the said bar in the vicinity of the longitudinal edge thereof remote from the shaft 14. Each tapped hole carries a hexagon-headed bolt 20 provided with a locknut 21, each bolt 20 being adjustable to vary the distance from its end remote from its head to the clamp bar 13 and being secured in the adjusted position by means of the locknut 21.

Figure 2:
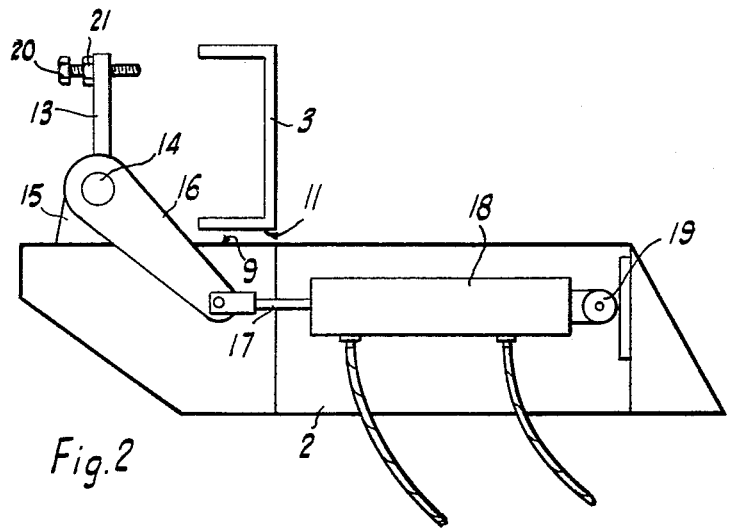
FIGURE 2 is a diagrammatic side view of the clamp bar and part of the machine in FIGURE 1, the clamp bar being in the disengaged or non-clamping position.
Figure 3:
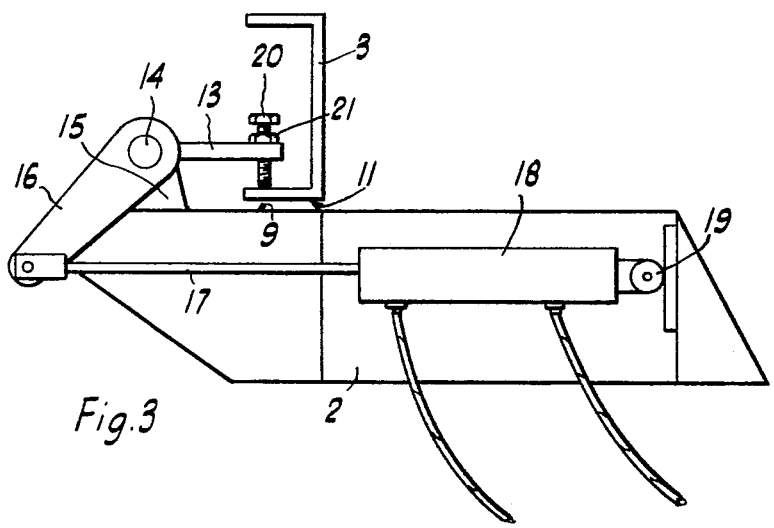
FIGURE 3 is a view similar to that of FIGURE 2, but with the clamp bar in the engaged or clamping position.

In use, the clamp bar 13 is moved, upon actuation of the piston and cylinder mechanism 18, from a disengaged position, shown in FIGURE 2, into a position, shown in FIGURES 1 and 3, in which the ends of the bolts 20 engage with the clamping frame 3, to support the sheet 12 of thermoplastic material. The piston and cylinder mechanisms 18 apply clamping pressure to the clamp bar 13 through the piston rods 17 and extensions 16, and the clamping pressure is transmitted through the bolts 20 to effectively clamp the sheet 12 in position so that it may be heated and formed. After the heating and forming operations the moulded sheet is removed from the vacuum-forming machine by the actuation of the piston and cylinder mechanisms 18 to withdraw the piston rods 17 and rotate the clamping bar 13 to the position shown in FIGURE 2. The clamping frame 3 is then lifted by the piston and cylinder assemblies 4 to allow removal to take place.

The bolts 20 may be adjusted and the locknuts 21 secured to obtain evenly distributed clamping pressure transmitted from the clamp bar 13 to the clamping frame 3 and thence to the sheet 12 which is clamped and also to compensate for any variations which may take place in the course of time in the shape of the clamping frame 3, for example, by warping or strain.

Having now described our invention, what we claim is:

1. A vacuum forming machine for forming sheets of thermoplastic material comprising a machine member having a sheet clamping surface, a clamping frame movable towards and away from the clamping surface during a clamping operation, a clamp bar engageable with the clamping frame, a plurality of bolts attached to and spaced along the length of the clamp bar, a plurality of locknuts attached one to each bolt, and means operably connected to the clamp bar to move the clamp bar into and out of engagement with the clamping frame and to apply clamping pressure, through the bolts, to the clamping frame.

2. A vacuum-forming machine according to claim 1 wherein the clamp bar is pivotally supported with respect to the machine member to enable the bolts to be pivotally moved into and out of contact with the clamping frame.

3. A vacuum-forming machine according to claim 1 wherein the means for moving the clamp bar into and out of engagement with the clamping frame and for applying clamping pressure to the clamp bar comprises at least one double-acting fluid operated piston and cylinder assembly.

References Cited by the Examiner

UNITED STATES PATENTS

| | | | |
|---|---|---|---|
| 2,134,754 | 11/38 | Flint et al. | 18—19 |
| 2,907,069 | 10/59 | Butzko | 18—19 |
| 3,061,881 | 11/62 | Sherno | 18/19 XR |

FOREIGN PATENTS

| | | |
|---|---|---|
| 827,845 | 2/60 | Great Britain. |

WILLIAM J. STEPHENSON, *Primary Examiner.*